United States Patent [19]

Rae et al.

[11] Patent Number: 4,994,242
[45] Date of Patent: Feb. 19, 1991

[54] JET IMPINGEMENT REACTOR

[75] Inventors: John M. Rae, Vancouver; Edward G. Hauptmann, West Vancouver, both of Canada

[73] Assignee: Noram Engineering and Constructors Ltd., Vancouver, Canada

[21] Appl. No.: 405,930

[22] Filed: Sep. 12, 1989

Related U.S. Application Data

[63] Continuation-in-part of Ser. No. 232,339, Aug. 15, 1988, abandoned.

[51] Int. Cl.$^5$ .............................................. B01F 5/02
[52] U.S. Cl. .................................. 422/224; 422/195; 422/228; 422/239; 239/432; 239/590.3; 239/590.5; 55/265; 55/446; 138/37; 138/42; 366/336; 366/340
[58] Field of Search ............... 422/195, 228, 239, 224; 239/590, 590.3, 590.5, 432; 55/445, 446, 265; 138/37, 39, 42; 366/336, 340

[56] References Cited

U.S. PATENT DOCUMENTS

| | | | |
|---|---|---|---|
| 4,043,539 | 9/1977 | Gilmer et al. | 366/340 |
| 4,136,976 | 1/1979 | Leffelman | 366/336 |
| 4,208,136 | 6/1980 | King | 138/37 |
| 4,361,407 | 11/1982 | Pellegrini | 366/340 |
| 4,398,563 | 9/1983 | Ray et al. | 138/42 |
| 4,514,095 | 4/1985 | Ehrfeld et al. | 366/340 |
| 4,596,699 | 6/1986 | Desgrandchamps et al. | 422/195 |
| 4,647,212 | 3/1987 | Harkinson | 366/340 |
| 4,669,890 | 6/1987 | Peyrot | 366/340 |
| 4,786,185 | 11/1988 | Krief | 366/340 |

Primary Examiner—Robert J. Warden
Assistant Examiner—Lynn M. Kummert
Attorney, Agent, or Firm—Townsend and Townsend

[57] ABSTRACT

An apparatus to allow reaction in the liquid phase. The apparatus is a vessel having a baffle. There are openings in the baffle through each of which a liquid passes as a jet. Neighboring openings are sufficiently close to allow impingement of the jets thereby allowing for reaction of the liquids. The invention finds application in reactions where the reactants are immiscible and is particularly suitable in the nitration of aromatic hydrocarbons using mixed acids in aqueous solution. A method of conducting a reaction between at least two reactants in the liquid phase is also provided comprising passing a liquid containing the reactants through a plurality of adjacent spaced openings to create a series of impinging jets.

9 Claims, 7 Drawing Sheets

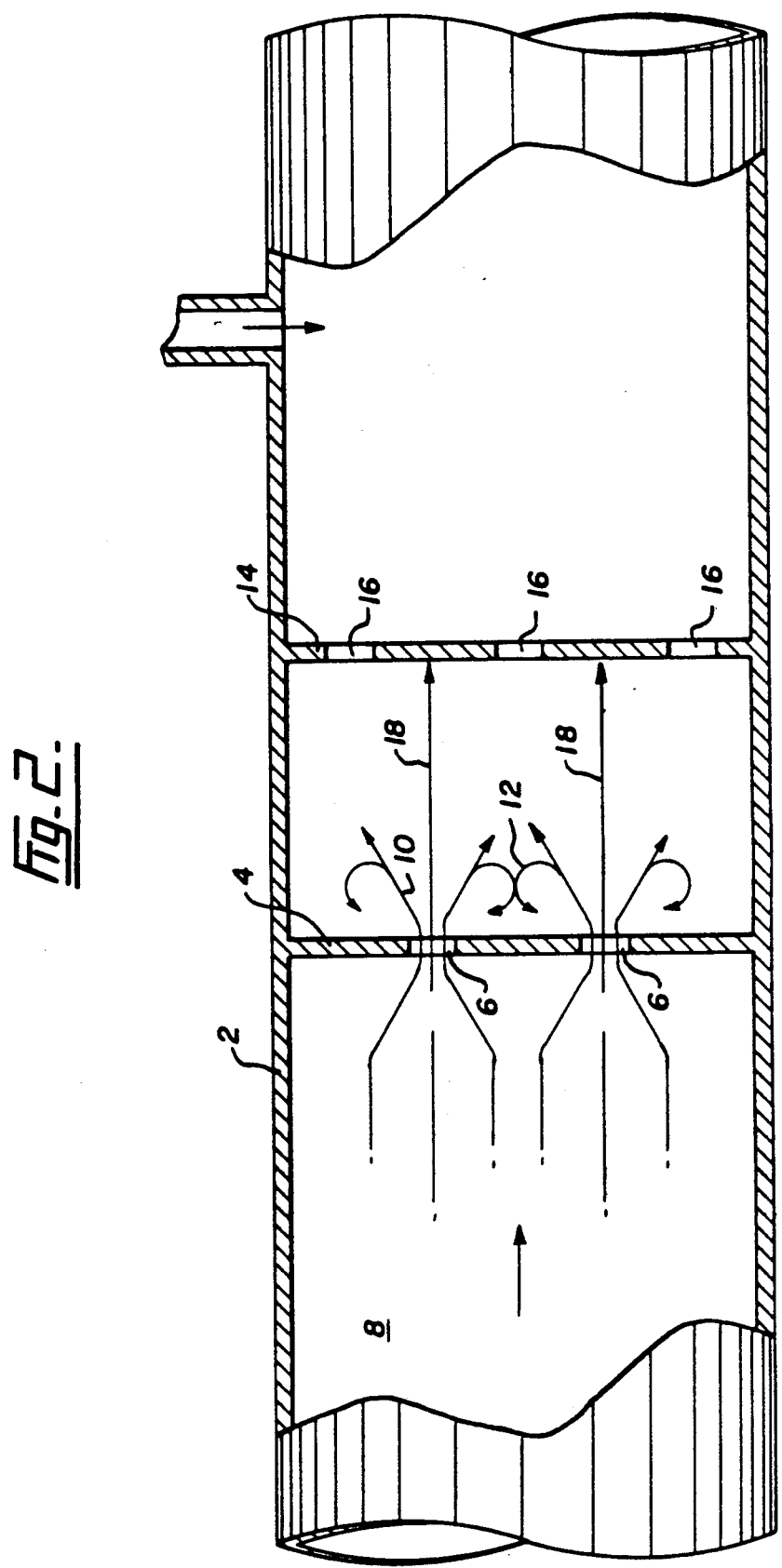

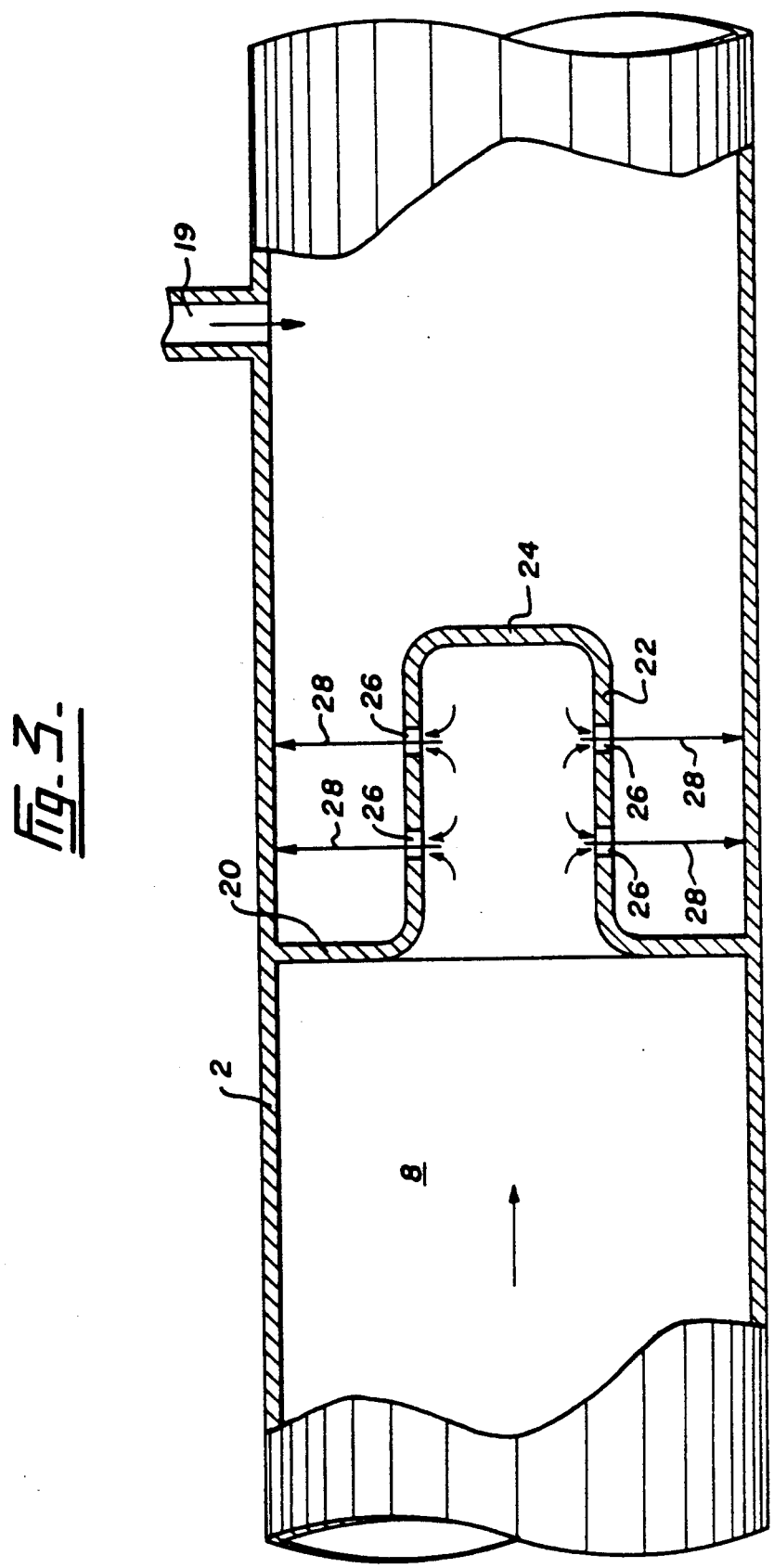

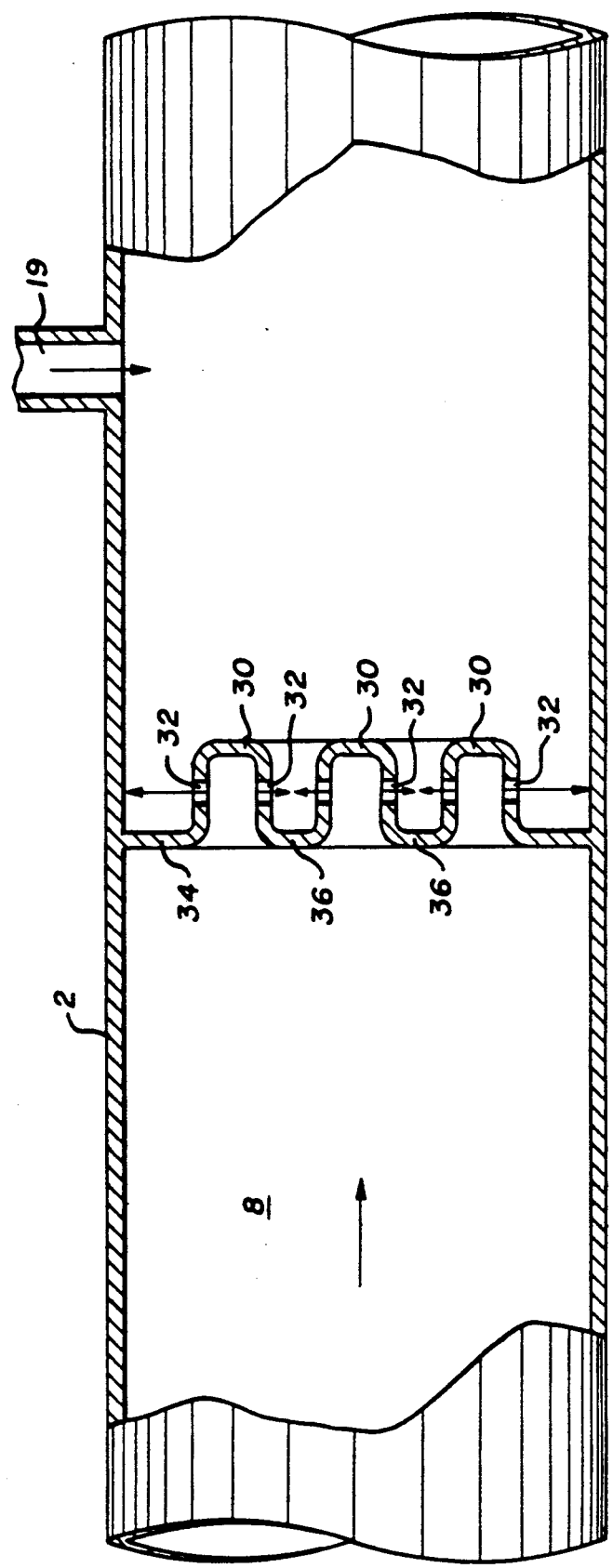

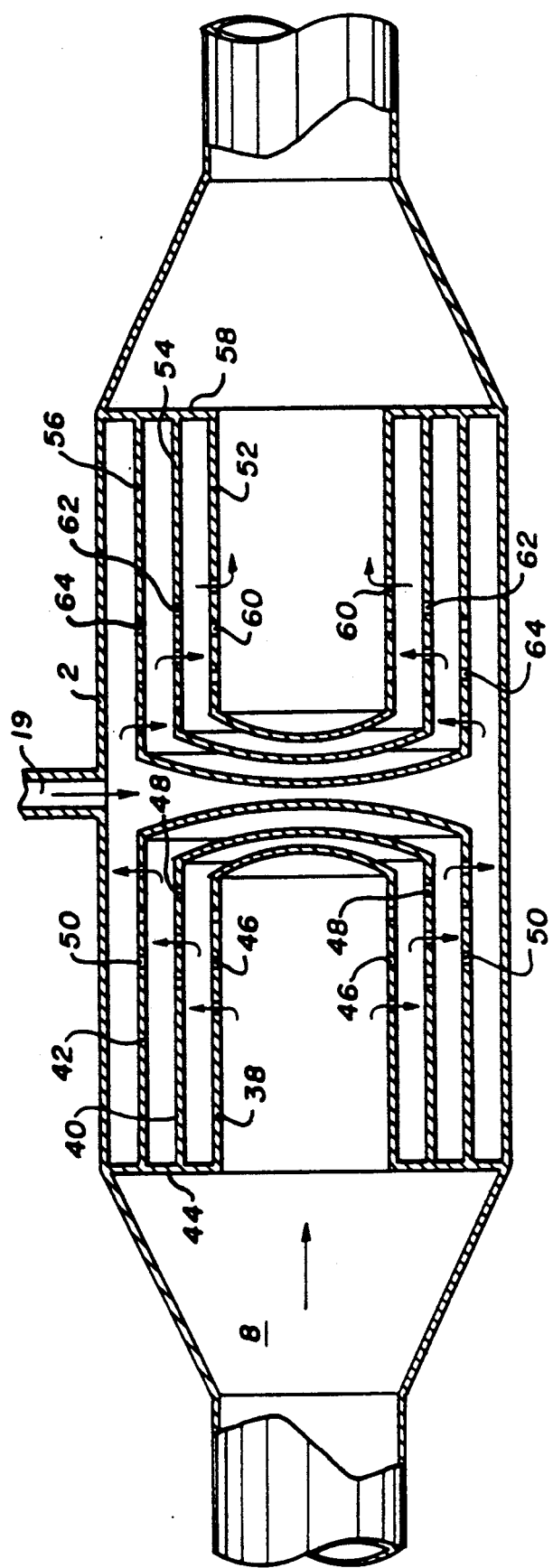

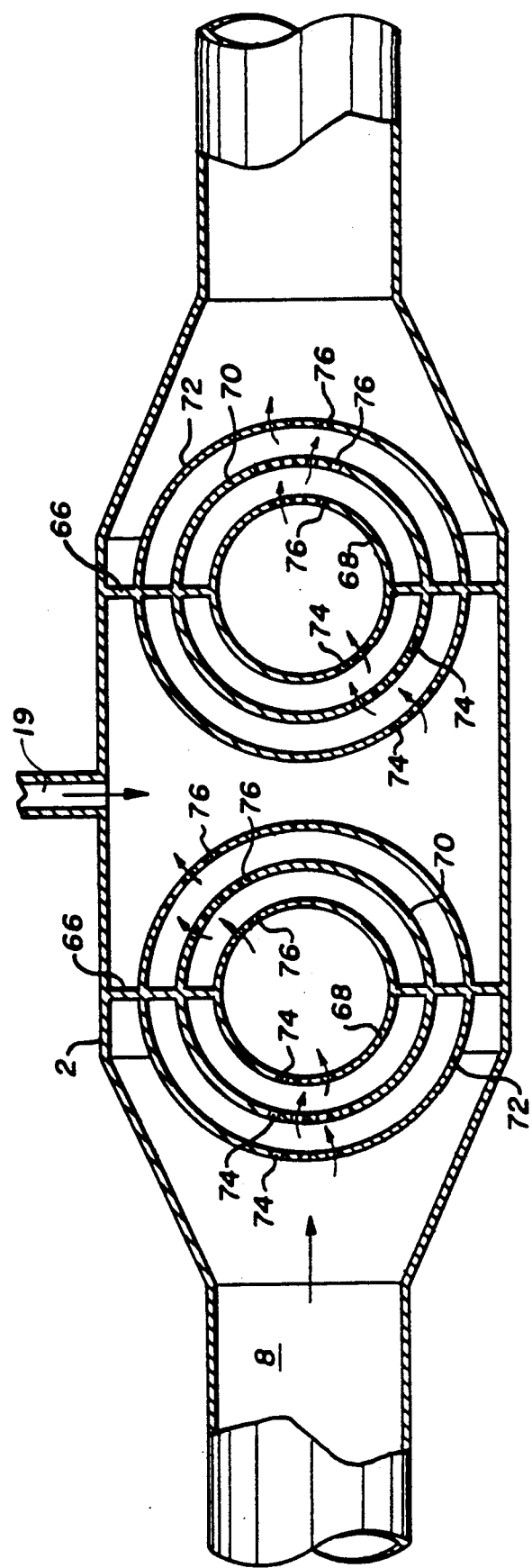

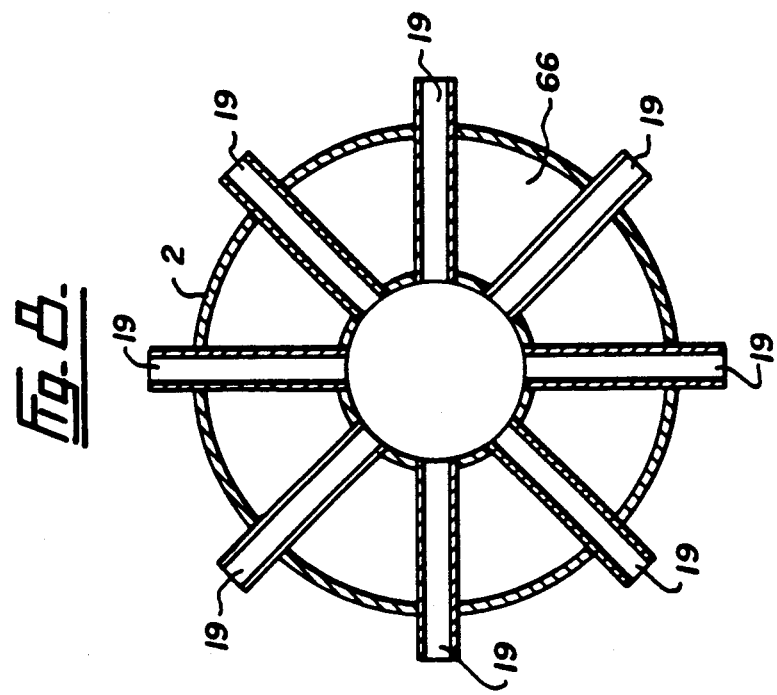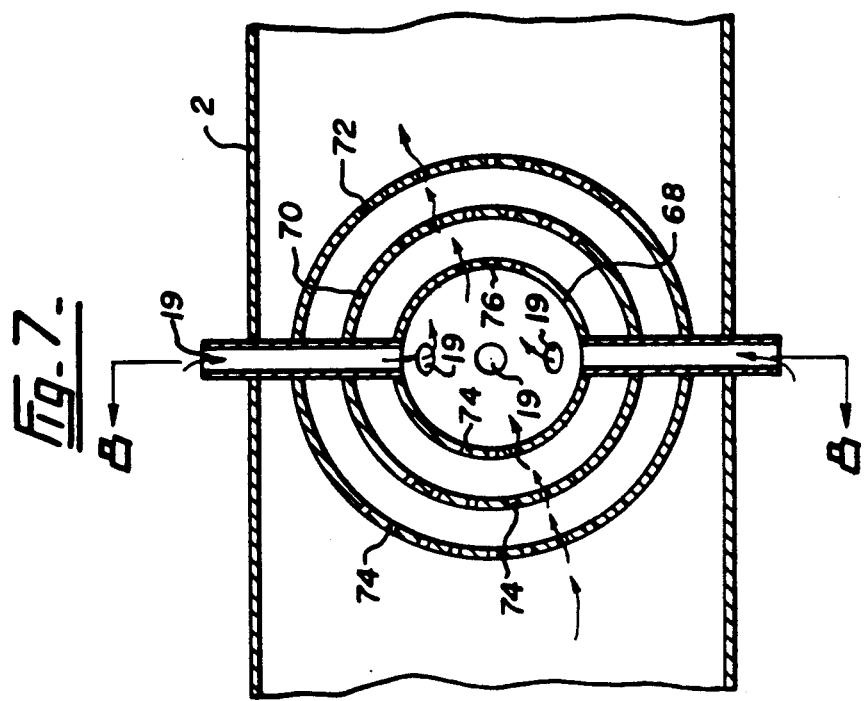

4,994,242

JET IMPINGEMENT REACTOR

This application is a continuation-in-part of application Ser. No. 07/232,339, filed Aug. 15, 1988, now abandoned.

FIELD OF THE INVENTION

This invention relates to an apparatus to allow a reaction in the liquid phase and to a method for conducting a reaction. The invention finds application in reactions where the reactants are immiscible. The invention is of particular application in the nitration of aromatic hydrocarbons using mixed acids in aqueous solution.

DESCRIPTION OF THE PRIOR ART

It is known that vigorous agitation is required for nitration reactions between an aromatic hydrocarbon and a mixture of sulfuric acid and nitric acid, commonly called mixed acid. Most of the known nitration processes using mixed acid use reactions vessels that incorporate agitation. These reactions are notoriously dangerous. They are highly exothermic and potentially explosive but it is well known that the risks inherent with these processes can be reduced if the charge of unreacted components can be made small.

It is also well known that the formation of undesirable by-products is increased as residence time within the apparatus is increased. For example, in processes for the manufacture of mononitrobenzene, U.S. Pat. No. 4,021,498 to Alexanderson recognized that a reaction time of 0.5 to 3 minutes was preferred and U.S. Pat. No. 2,256,999 to Castner indicates a complete reaction in about 10 minutes. It is not as well known that by-product production also increases with temperature.

It has, however, been found that when such processes are scaled up the efficiency of the reactant conversion is often less than that achieved on a small scale. This reduction in efficiency is commonly overcome by adding further conventional stirred tank reactors to the system. This has the effect of increasing the residence time, which increases the charge of unreacted and reacted components and increases the formation of undesirable by-products. Inevitably, the continuous stirred tank reactor, when operated in a manner necessary to provide the desired vigorous agitation, is subject to wear and mechanical breakdown.

U.S. Pat. No. 4,453,027 to Vaidyanathan teaches that halobenzenes can be nitrated in a tubular reactor of the static-mixer type. It has been found, however, that the efficiency of these static-mixers is also reduced when scaled up to sizes practical for large scale production. This is probably due to the comparatively low velocities available within the constraints of space and residence time.

It is therefore recognized that a need exists for apparatus that permits nitration processes to operate efficiently and safely in large commercial applications.

Prior art devices for handling fluids are well known, however, these devices are generally limited to performing mixing and blending operations.

U.S. Pat. No. 4,514,095 to Ehrfeld et al. discloses a motionless mixer in which a series of discs are arranged so that fluid passing through the mixer is divided into a number of streams whereupon the streams are recombined to thoroughly blend the fluid.

U.S. Pat. No. 4,043,539 to Gilmer et al. teaches a static-type mixer comprising a conduit that separates a fluid or fluids to be mixed into a series of parallel streams. A portion of the fluid is diverted laterally from a main passage and the remainder of the flow is then reversed to rejoin the diverted portion in order to produce a mixing effect.

U.S. Pat. No. 4,136,976 to Leffelman also teaches a static mixing device comprising a cylinder having an inlet and outlet and a plurality of hollow spheres with openings therethrough mounted within the cylinder. Fluids flowing through the cylinder are mixed in the turbulent flow that is created about the spheres.

U.S. Pat. No. 4,361,407 to Pelligrini discloses a further example of a stationary mixing device that uses a series of separable stages in which are formed cavities and alignable holes to define passages for the flow of fluids to be mixed. Fluids are divided and recombined in the passages to create an essentially homogeneous mixture after passing through several of the stages.

The devices of the prior art are essentially concerned with mixing or blending of miscible fluids. In contrast, the apparatus and method of the present application is concerned with accelerating reactions between immiscible fluids that have been previously mixed. The apparatus of the present application accepts a flowing fluid comprising two or more immiscible and reactive liquids and uses the energy from the flow of the fluid to create a high shear on the fluid that breaks up a portion of the flow into small droplets having a large exposed surface area. These small droplets provide a greatly increased surface area for chemical reaction between the liquids thereby greatly accelerating the reaction rate. The shearing action is achieved by passing the fluid through sharp edged holes, and by impinging the resulting jets against a surface or against other jets or a slower moving fluid.

SUMMARY OF THE INVENTION

Accordingly, the present invention provides an apparatus to allow reaction in the liquid phase and comprising:
  a vessel having a longitudinal axis;
  a baffle in the vessel;
  a plurality of first openings in the baffle through each of which a liquid passes as a jet, neighbouring openings being spaced to allow impingement of the jets.

In a further aspect the present invention is a method of conducting a reaction between at least two reactants in the liquid phase comprising: passing a liquid containing the reactants through a plurality of adjacent spaced openings to create a series of impinging jets.

BRIEF DESCRIPTION OF THE DRAWINGS

Aspects of the invention are illustrated, merely by way of example, in the accompanying drawings in which:

FIG. 2 is a view similar to FIG. 1 of a further embodiment of the present invention;

FIG. 3 is a section through yet a further embodiment of the invention;

FIG. 4 shows a development of the embodiment of FIG. 3;

FIG. 5 is a section of a further apparatus according to the present invention;

FIG. 6 illustrates yet a further embodiment of the present invention;

FIG. 7 shows an inlet system for introducing reactants into the apparatus of the present invention;

FIG. 8 is a section view through the inlet system taken along line 8—8 of FIG. 7.

DESCRIPTION OF THE PREFERRED EMBODIMENT

Figure 1:
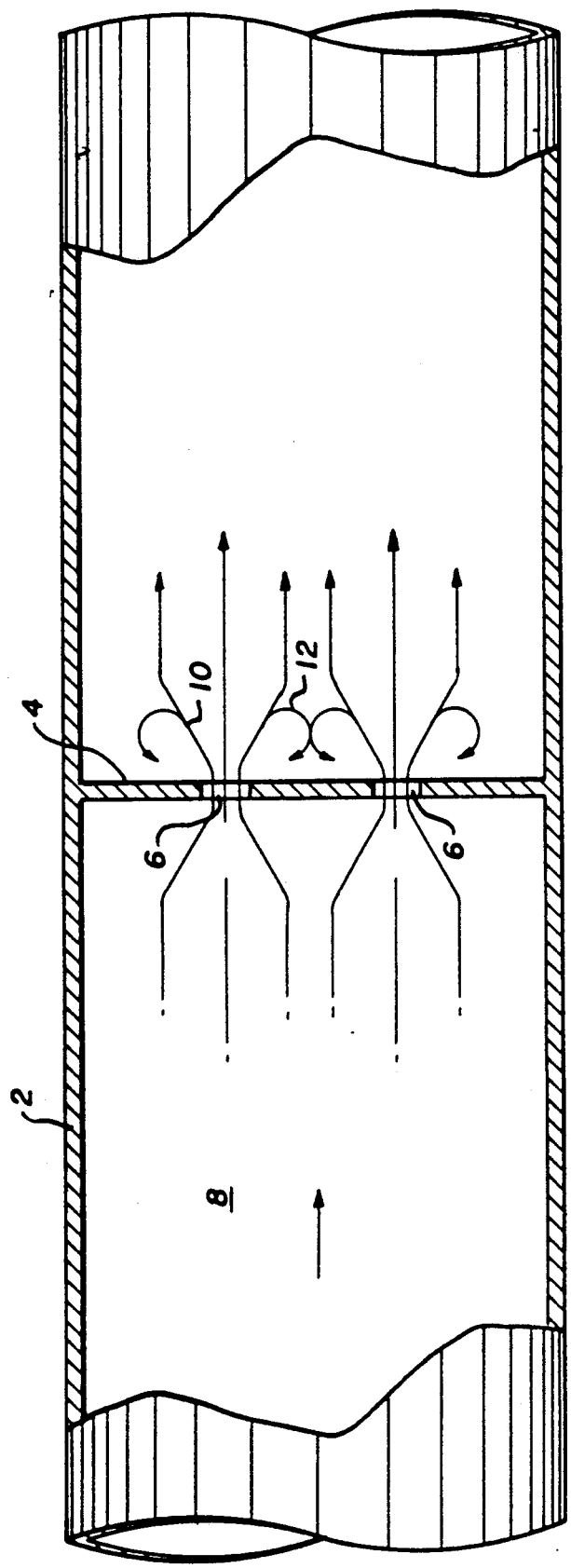
FIG. 1 is a side elevation, partially in section, of an apparatus according to the present invention.

Each drawing shows an apparatus according to the present invention.

FIG. 1 shows a reactor comprising a vessel 2 in the form of an open-ended cylinder. There is a baffle 4 in the vessel 2 and a plurality of first openings 6 in the baffle 4. Through each of these openings 6, a liquid 8, passing through the vessel 2, passes as a jet 10. The openings 6 are arranged sufficiently close to allow impingement of the jets 10, as schematically illustrated by the arrows 12 in FIG. 1.

FIG. 2 shows the presence of a second baffle 14, spaced downstream from the first baffle 4. There is a plurality of second openings 16 in the second baffle 14. The second openings 16 are arranged so that the first and second openings 6 and 16 are not aligned. Thus the jets 10 from the first openings impinge on the second baffle 14 as shown by the arrows 18 in FIG. 2. There is an inlet for further reactants at 19 and further baffles, with openings, are placed downstream to provide a further reaction location.

In the embodiments of FIGS. 1 and 2, the first and second openings 6 and 16 are both arranged to direct the jets 10 longitudinally of the apparatus. In both cases, the first and second baffles 4 and 14 extend transversely of the vessel 2. However, FIG. 3 illustrates an embodiment of the invention in which the baffle 20 comprises an annulus extending inwardly from the periphery of the vessel 2. A cylinder 22 extends longitudinally of the vessel 2, from the inner periphery of the annular baffle 20, to terminate in a closure 24 that is parallel to the annular baffle 20. Openings 26 are formed in the cylinder 22 so that jets 28 are directed by the openings 26 transverse of the vessel 2. In the embodiment of FIG. 4 there is a plurality of cylinders 30, each having first openings 32, extending from annular walls 34 and 36. Again inlet 19 for further reactants is present in FIGS. 3 and 4 and there will be a further reaction location downstream.

FIG. 5 illustrates an apparatus in which there is a plurality of generally coaxial cylinders 38, 40 and 42, each extending from an annular wall 44 extending from the periphery of vessel 2. Openings 46, 48 and 50 are arranged so that the liquid 8 flowing through an opening in an inner cylinder impinges on the wall of an outer cylinder before it can pass through openings in that outer cylinder.

FIG. 5 also illustrates a particular embodiment of the invention in which there are opposed cylinders. Thus FIG. 5 also shows cylinders 52, 54 and 56 extending from annular wall 58 towards wall 44. Openings 60, 62 and 64 are formed in cylinders 52, 54 and 56.

FIG. 6 illustrates an embodiment of the invention in which baffles 66 are formed as generally concentric spheres 68, 70 and 72 each having inlet openings 74 and outlet openings 76 arranged so that liquid flowing in the vessel 2 must pass through the inlets 74, to the inner spheres 68, then outwardly.

Reactants can be added to the embodiment of FIG. 6 through inlet 19. An inlet system that uses a multiplicity of pipes distributed radially around reactor vessel 2 may be also be used. The location of the inlet pipes 19 may also be between stages of the concentric spheres, as shown in FIG. 7. FIG. 8 shows a sectional view through the multiple delivery pipes 19 to demonstrate the arrangement of the pipes through the vessel walls and into the concentric spheres. The number and size of the inlet pipes 19 are arranged to ensure a very high velocity jet, with very small droplets entering the reactor.

Using the apparatus of the present invention the local velocity of each stage can be made sufficiently high to create conditions necessary for a nitration reaction between an aromatic hydrocarbon and mixed acid in the liquid 8 to take place independently from the bulk velocities of the reactants passing through the apparatus. The proportions of the apparatus can be adjusted, using simple experimental techniques, to achieve a wide range of intensive agitation and residence time.

The apparatus can be used either as a single unit or as a number of units connected in series or in conjunction with one or more continuously stirred tank reactors.

The apparatus of the invention is immediately of use in the adiabatic mononitration of benzene because of the large scale manufacture of this product. However, the invention can also be used in the nitration of other aromatic hydrocarbons or halogen substituted aromatic hydrocarbons.

The particular benefit provided by the present invention is the degree of agitation that is available. This ensures that the reaction rate and conversion efficiency of the reactor are high. The desired high agitation is accomplished by causing the jets containing the liquid 8 of aromatic hydrocarbon and mixed acids to be directed towards each other so as to provide varying degrees of impingement of the jets. This impingement, or interplay, of the jet produces high shear rates in the liquid, much higher for example than provided by propeller blades in a conventional stirred tank reactor or than of the shearing rates in a static mixer reactor. In addition to the shear between the jets a certain portion of the jet streams will directly impinge so as to bring droplets of the dispersed phase into direct contact and further enhance the reaction. The direct impingement of the jets, along with the relative shear between the jets, will produce a constant supply of fresh interface between the reacting components, thereby enhancing the reaction rate and overall conversion efficiency of the reactor.

An additional benefit provided by the present invention is the ability to add reactants in a high velocity jet directly into a region of high-intensity mixing as shown by the inlet system of FIG. 7 and 8. The high velocity produces a jet of small droplets having a high surface area to mass ratio, thereby promoting the overall conversion of the reactants.

The particular arrangement used to bring about jet impingement will vary according to the rate of reaction required. In the simplest form, as shown in FIGS. 1 and 2, the lowest degree of impingement is provided. The liquid jets are disposed parallel. The impingement occurs when the jets spread and combine in a downstream direction. Impingement is due to lateral components of the turbulent velocity in the jets.

The embodiment of FIG. 2, with its downstream impingement plate, causes the jets to change direction and impinge more directly. The provision of orifices in the second plate ensures a second stage of reaction. Further amounts of reactants can then be introduced through inlet 19 to increase the efficiency of conversion and minimize byproduct formation. That is, still further stages or reaction locations can be arranged, depending on the degree of reaction required.

In the FIG. 3 embodiment the jets are turned so that they impinge on the wall of the reactor. In this embodiment the impingement, shearing and mixing of the components is further enhanced by the requirement of the fluid to turn back into the main fluid direction, as shown by the arrows. Such an arrangement can also be repeated in stages to the desired degree of reaction.

In the embodiment of FIG. 4, the multiplicity of lateral jets ensures that some of the liquid jets will impinge directly on each other, achieving the highest possible degree of agitation and therefore reaction rate. The arrangement of annular walls and cylinders shown in FIG. 4 can be repeated downstream for further conversion, if required. Further reactants can be added through inlet 19 prior to each stage as discussed above for FIG. 2.

FIGS. 1 to 4 show the flow direction to be axial, but the same principles can also be used if the flow arrangement be radial as shown by the cylindrical arrangement of FIG. 5, and the spherical arrangement of FIG. 6.

In FIG. 5 the flow issues outwardly through a series of cylinders. The successive outward cylinders are preferably arranged so that the openings are not in line, producing the maximum benefit of reaction as discussed for FIG. 2. The same arrangement can be used equally with the flow passing radially inwardly through the cylindrical shells. Again reactants may be added between the two stages through inlet 19. The first stage is defined by cylinders 38, 40 and 42 and the second by cylinders 52, 54 and 56. Again this reactant addition between stages improves conversion.

In FIG. 6 the flow issues outward through a series of spheres, each with openings to produce jets. The openings are successively offset to produce maximum reactions as in the case of FIG. 2. Flow can also be directed radially inward, that is opposite to that shown in FIG. 6, and combination of radial inflow and outflow can be combined to form a compact stage. Many more stages can be added in the continuation of this principle.

In FIG. 7, the reactants are introduced directly between the concentric spheres shown through a plurality of inlet pipes 19 arranged radially about vessel 2. The size and number of the inlets is chosen appropriately so that the reactant jet velocity is very high. This promotes the formation of small droplets of reactant which leads to high overall reaction rates and high conversion efficiency.

A virtue of the apparatus according to the invention is compactness where the prior art equipment can be massive. Thus, in the embodiments of FIGS. 1 to 4, the vessels 2 can be cylinders of a diameter within the range 6 to 12 inches. The openings 6, 16, 26 and 32 may have a diameter of about ¼ inch. They are symmetrically arranged in walls 4 and 14.

Flow rates can, for example, be in the range of 100 to 800 U.S. gallons per minute.

In the embodiment of FIGS. 5 and 6 the end pipes shown may, for example, have diameters of about 8 inches. The vessels 2 have, for example, diameters of about 12 inches. Openings 60, 62, 64, 74 and 76 have diameters, for example, in the range ¼ to ½ inch.

In the embodiment of FIG. 7, the inlet pipes 19 may be 1/16 to 5/16 inch with any number of such inlets, for example, 32, disposed radially about the reactor vessel. This embodiment could be used, for example, if only the aromatic hydrocarbon is being added through the inlets.

The apparatus may be made of glass lined steel, as in the prior art, but preferably are made from zirconium or tantalum or any suitable corrosion-resistant material.

I claim:

1. Apparatus to allow reactions in the liquid phase and comprising:
   a vessel having a longitudinal axis;
   a baffle in the vessel comprising a plurality of spheres of different diameters, arranged one within the other, each sphere being formed with a plurality of first openings defining inlets and a plurality of second openings defining outlets, each first and second opening allowing liquid to pass therethrough as a jet and neighboring openings being spaced apart so as to allow impingement of the jets.

2. Apparatus as claimed in claim 1 including a plurality of stages, each stage comprising at least one baffle;
   an inlet for further reactants between each stage.

3. Apparatus as claimed in claim 2 in which each stage comprises a plurality of baffles.

4. Apparatus as claimed in claim 1 including an inlet for introducing reactants.

5. Apparatus as claimed in claim 4 in which said inlet comprises a plurality of pipes arranged radially about said vessel.

6. Apparatus as claimed in claim 1 including an inlet for introducing reactants, said inlet comprising a plurality of pipes arranged radially about said vessel and extending through said spheres.

7. Apparatus as claimed in claim 6 in which said inlet pipes open into the sphere having the smallest diameter.

8. Apparatus to allow reactions in the liquid phase and comprising a vessel having a longitudinal axis;
   a baffle in the vessel comprising a plurality of spheres of different diameters, arranged one within the other, each sphere being formed with a plurality of first openings defining inlets and a plurality of second openings defining outlets, each first and second opening allowing liquid to pass therethrough as a jet and neighboring openings being spaced apart so as to allow impingement of the jets;
   an inlet for introducing reactants, said inlet comprising a plurality of pipes arranged radially and extending through said spheres.

9. Apparatus as claimed in claim 8 in which said pipes open into the sphere having the smallest diameter.

* * * * *